(12) United States Patent
Nishimachi

(10) Patent No.: US 9,977,927 B2
(45) Date of Patent: May 22, 2018

(54) DATA READ-OUT DEVICE AND INFORMATION PROCESSING APPARATUS

(71) Applicant: Sharp Kabushiki Kaisha, Osaka (JP)

(72) Inventor: Takashi Nishimachi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days. days.

(21) Appl. No.: 14/475,823

(22) Filed: Sep. 3, 2014

(65) Prior Publication Data
US 2015/0060545 A1   Mar. 5, 2015

(30) Foreign Application Priority Data

Sep. 3, 2013 (JP) ................... 2013-182419
Jul. 24, 2014 (JP) ................... 2014-150979

(51) Int. Cl.
| | | |
|---|---|---|
| G06K 7/00 | (2006.01) | |
| G06K 7/10 | (2006.01) | |
| G06F 1/16 | (2006.01) | |
| G06F 1/18 | (2006.01) | |
| G06K 7/01 | (2006.01) | |
| G06Q 20/18 | (2012.01) | |

(52) U.S. Cl.
CPC ....... *G06K 7/10009* (2013.01); *G06F 1/1601* (2013.01); *G06F 1/1607* (2013.01); *G06F 1/183* (2013.01); *G06K 7/01* (2013.01); *G06Q 20/18* (2013.01)

(58) Field of Classification Search
CPC ............. G06K 7/1097; G06K 17/0025; G06K 17/0029

USPC .................. 235/439, 462.14, 462.46, 472.02
See application file for complete search history.

(56) References Cited

U.S. PATENT DOCUMENTS 7,481,360 B1 * 1/2009 Ramachandran ...... G06Q 20/18
    235/379
8,104,676 B2 * 1/2012 Ramachandran .... G06Q 20/042
    235/379

(Continued)

FOREIGN PATENT DOCUMENTS

CN        1293787 A      5/2001
GB      2347250 A  *   2/2000

(Continued)

*Primary Examiner* — Daniel St Cyr
(74) *Attorney, Agent, or Firm* — Keating & Bennett, LLP

(57) ABSTRACT

A card reader (data read-out device) causes an image display section to display an image that indicates a predetermined portion on a display surface of a display panel, as a portion where a non-contact IC card (recording medium) is to be close. An antenna for making communications with a non-contact IC card is arranged at a portion located at the rear side of the predetermined portion on a rear surface of the display panel. In a case where a user brings a non-contact IC card close to the predetermined portion on the display surface presented as an image, the card reader reads out data from a non-contact IC card wirelessly by using an antenna. A user can identify a portion where a recording medium is to be brought close without turning his/her gaze away from the display surface of the card reader. Therefore, it is possible to bring a recording medium close to a proper position so as to enable reading out data.

8 Claims, 20 Drawing Sheets

(56) References Cited

U.S. PATENT DOCUMENTS

| | | | | |
|---|---|---|---|---|
| 8,313,020 B2* | 11/2012 | Ramachandran | .... | G06Q 20/042 235/379 |
| 8,540,142 B1* | 9/2013 | Lewis | .................... | G06Q 40/02 235/379 |
| 8,838,464 B1* | 9/2014 | Whitney | ............. | G06F 19/3456 705/3 |
| 2014/0217176 A1* | 8/2014 | Baldischweiler | ....... | G06F 3/044 235/451 |

FOREIGN PATENT DOCUMENTS

| | | |
|---|---|---|
| JP | 2004-133009 A | 4/2004 |
| JP | 2004-355580 A | 12/2004 |
| JP | 2008-181371 | 8/2008 |
| JP | 2011-180699 A | 9/2011 |
| JP | 2012-190486 A | 10/2012 |
| WO | 99/54841 A1 | 10/1999 |
| WO | 2013/106723 A2 | 7/2013 |

\* cited by examiner

F I G. 4
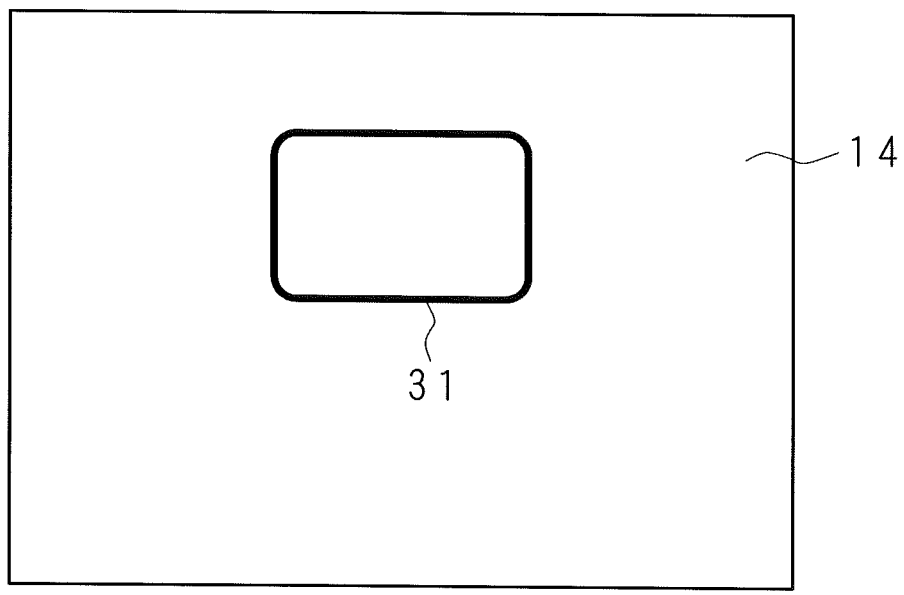

F I G. 1 6
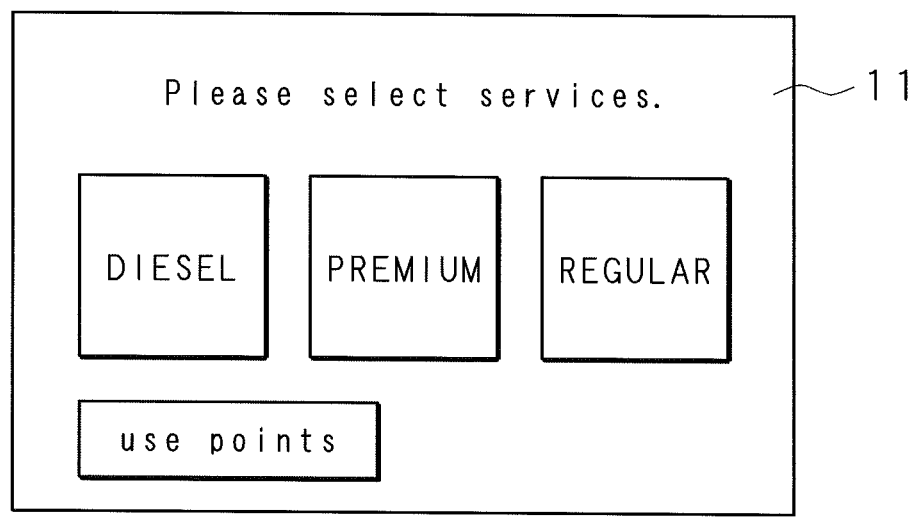

F I G. 1 8
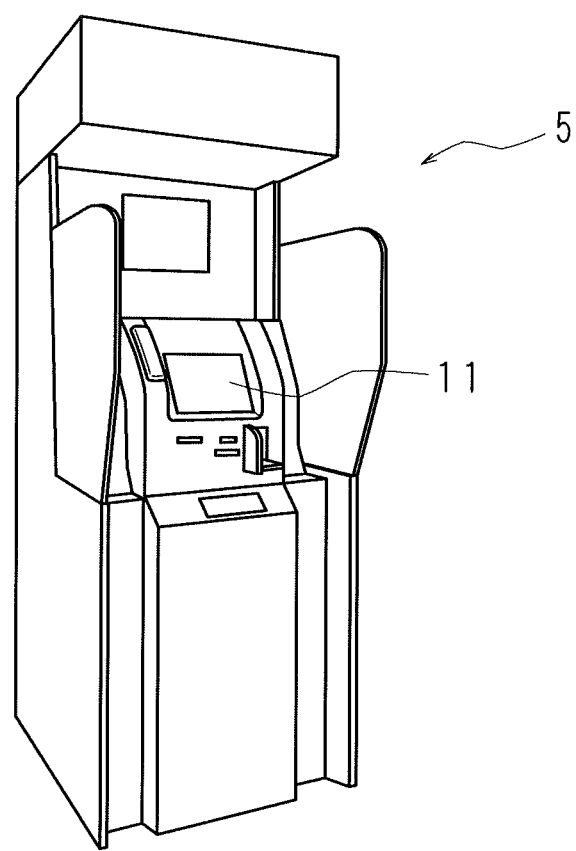

DATA READ-OUT DEVICE AND INFORMATION PROCESSING APPARATUS

CROSS-REFERENCE TO RELATED APPLICATIONS

This non-provisional application claims priority under 35 U.S.C. § 119(a) on patent application Ser. No. 2013-182419 filed in Japan on Sep. 3, 2013 and patent application Ser. No. 2014-150979 filed in Japan on Jul. 24, 2014, the entire contents of which are hereby incorporated by reference.

BACKGROUND

1. Technical Field

The present invention relates to a data read-out device and an information processing apparatus for reading out data recorded in a recording medium such as a non-contact IC card by wireless.

2. Description of Related Art

It is known that IC (integrated circuit) cards having a built-in IC chip to record data have been widely in use, and non-contact IC cards which are read out data without contact have also been widely in use. Japanese Patent Application Laid-Open No. 2008-181371 discloses a card reader for reading out data recorded in a non-contact IC card. The data read out from a non-contact IC card are used in information processing such as a personal authentication or payment. A card reader for a non-contact IC card is included in an information processing apparatus, which provides a service using a non-contact IC card, such as a terminal for issuing a residency registration document after a personal authentication by using a basic resident register card. Normally, when a non-contact IC card is very close to a planar read-out section of a card reader or a non-contact IC card is inserted into a predetermined insertion opening of a card reader, the card reader reads out data from a non-contact IC card. Some card readers include a function that informs a user about the position of a read-out section. For example, an image indicating the position of a read-out section may be displayed on an image display section in one card reader, or a read-out section may be illuminated in another card reader.

SUMMARY OF THE INVENTION

Even though a conventional card reader has a function of informing a user about the position of a read-out section, the user has trouble finding the position of the read-out section. In particular, with a card reader that causes an image display section to display an image indicating the position of the read-out section, the user has to turn his/her gaze away from the image display section in order to find the read-out section, which makes it inconvenient for the user to use such a conventional card reader.

In view of these circumstances, an object of the present invention is to provide a data read-out device and an information processing apparatus that are possible to handle a recording medium properly without making a user turning his/her gaze away from an image display section.

A data read-out device according to the present invention comprises: a read-out section for reading out data recorded in a recording medium by wireless; an image display section having an image display surface; and a control section causing the image display section to display an image indicating a predetermined portion on the image display surface to which the recording medium is to be close, wherein the read-out section reads out data recorded in the recording medium close to the predetermined portion.

In the data read-out device according to the present invention, the control section causes the image display section to display an image indicating a timing at which the recording medium is to be close to the predetermined portion.

In the data read-out device according to the present invention, the control section causes the image display section to display an image indicating the predetermined portion at a timing in which the recording medium is to be close to the predetermined portion.

In the data read-out device according to the present invention, the control section causes the image display section to display an image indicating an orientation of the recording medium of when the recording medium is close to the predetermined portion.

In the data read-out device according to the present invention, the recording medium is a card, and the control section causes the image display section to display an image of a card located at the predetermined portion, as an image indicating the predetermined portion.

In the data read-out device according to the present invention, the control section causes the image display section to display an image of the card at a timing in which the recording medium is to be close to the predetermined portion.

In the data read-out device according to the present invention, the control section causes the image display section to display an image that indicates an outer appearance of the card with an orientation of when the card is close to the predetermined portion, as an image of the card.

In the data read-out device according to the present invention, the image display section includes a display panel having one surface configured as the image display surface, the read-out section includes an antenna for reading out data from the recording medium by wireless, and the antenna is arranged at a portion located at the rear side of the predetermined portion on another surface of the display panel.

An information processing apparatus according to the present invention comprises: the data read-out device according to the present invention; and an information processing section for executing information processing using data read out from a recording medium by the data read-out device.

According to the present invention, a user can identify a portion to which a recording medium is to be brought close without turning his/her gaze away from a display surface of a data read-out device, and thus is possible to bring a recording medium close to a proper position for reading out data. Accordingly, the convenience of a data read-out device is improved, while the possibility of the occurrence of an error operation in a data read-out device is reduced. Thus, the present invention produces beneficial effects.

The above and further objects and features of the invention will more fully be apparent from the following detailed description with accompanying drawings.

BRIEF DESCRIPTION OF THE SEVERAL VIEWS OF THE DRAWINGS

FIG. 4 is a schematic rear view of a display panel;

FIG. 16 is a schematic view illustrating an example of a menu screen according to Embodiment 8;

FIG. 18 is a schematic view illustrating an example of an information processing apparatus according to Embodiment 9;

DETAILED DESCRIPTION

The present invention will specifically be described below with reference to the drawings illustrating the embodiments thereof.

Embodiment 1

Figure 1:
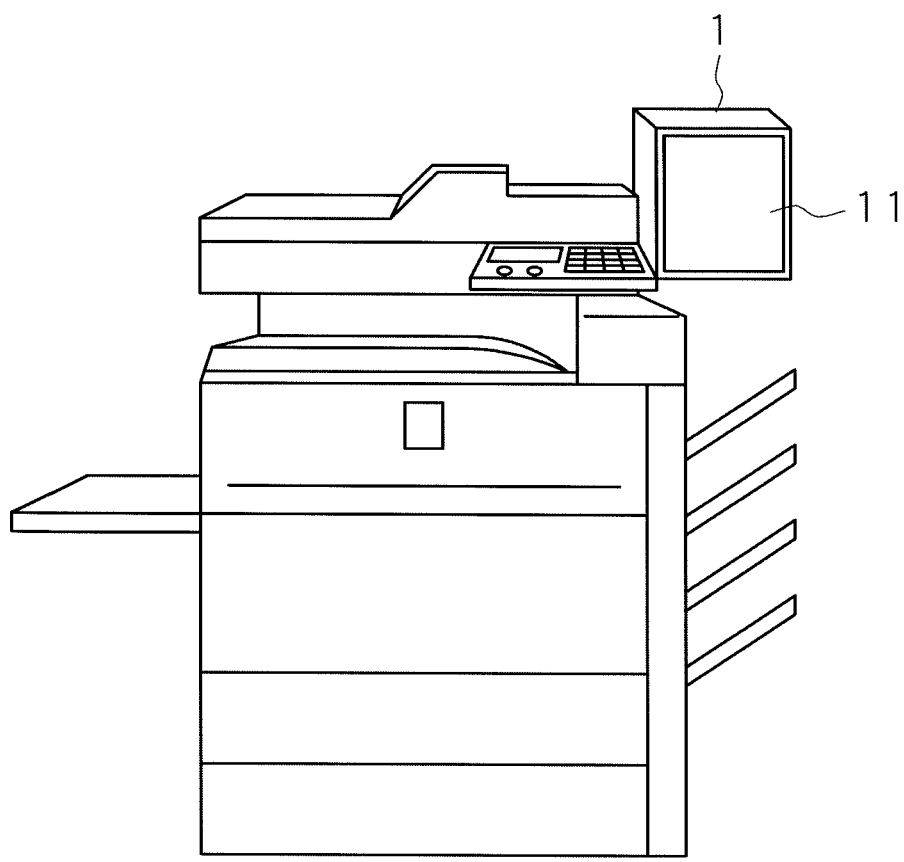
FIG. 1 is a schematic view illustrating an information processing apparatus according to Embodiment 1.
Figure 2:
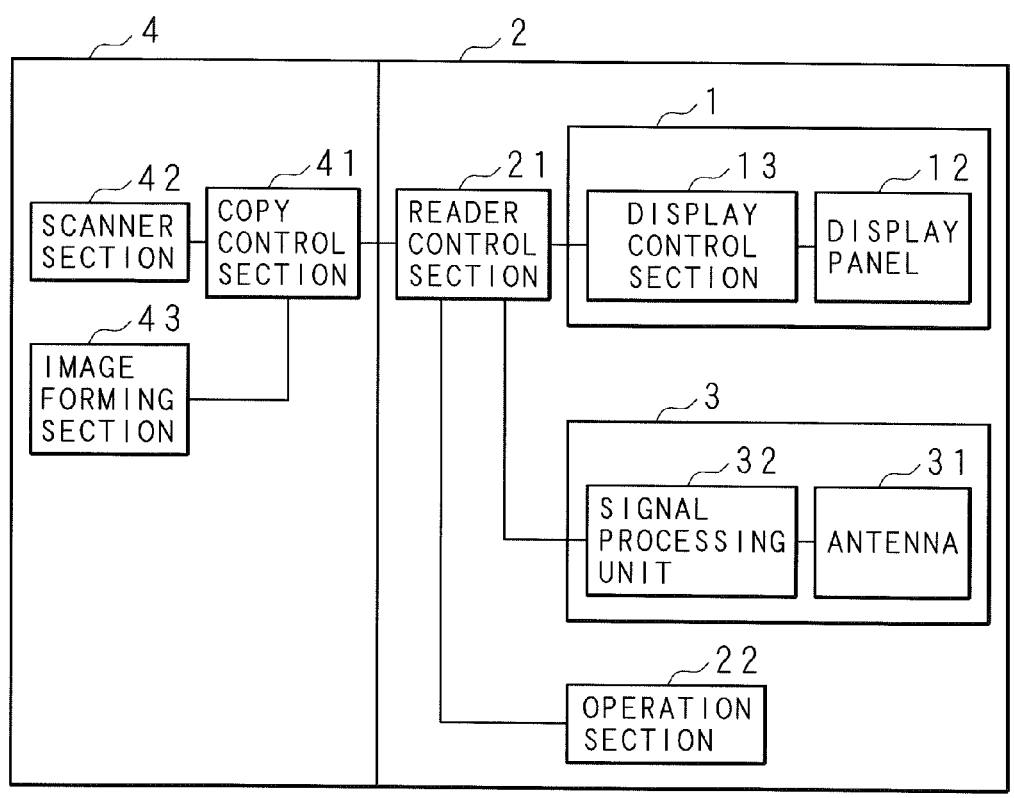
FIG. 2 is a block diagram illustrating the internal function configurations of a card reader and a copy machine constituting the information processing apparatus according to Embodiment 1.

FIG. 1 is a schematic view illustrating an example of an information processing apparatus according to Embodiment 1. In the present embodiment, an example is described where a recording medium is a non-contact IC card, a data read-out device according to the present invention is a card reader, and the information processing apparatus according to the present invention is configured by a card reader and a copy machine. The card reader includes an image display section 1 having a display surface 11 for displaying an image. FIG. 2 is a block diagram illustrating the internal function configurations of a card reader 2 and a copy machine 4 constituting the information processing apparatus according to Embodiment 1. The card reader 2 includes a reader control section 21 that operates the control of the card reader 2, a read-out section 3 that reads out data from a non-contact IC card, and an operation section 22 that accepts an operation from a user. The image display section 1, read-out section 3 and operation section 22 are connected to the reader control section 21.

The image display section 1 includes a display panel 12 such as an LCD (Liquid Crystal Display) panel or EL (Electro-Luminescence) panel, and a display control section 13 that causes the display panel 12 to display an image. The reader control section 21 inputs a specified image signal to the image display section 1, and the display control section 13 causes the display panel 12 to display a specified image based on the input image signal. The display panel 12 has one surface that is configured to be a display surface 11, on which an image is displayed. The reader control section 21 corresponds to the control section in the present invention. The operation section 22 is configured by a numeric keypad, touch panel or the like. The operation section 22 may be configured integrally with the image display section 1.

The read-out section 3 includes an antenna 31 for wireless communications with a non-contact IC card, and a signal processing unit 32. The antenna 31 is connected to the signal processing unit 32, and the signal processing unit 32 is connected to the reader control section 21. The reader control section 21 controls an operation of the signal processing unit 32. The signal processing unit 32 controls transmission/reception of data using the antenna 31 and performs processing of the received data. By communications with a non-contact IC card using the antenna 31, the signal processing unit 32 reads out data recorded in a non-contact IC card. The signal processing unit 32 inputs the read-out data to the reader control section 21. The reader control section 21 reads out data from a non-contact IC card wirelessly through the control of the signal processing unit 32. The reader control section 21 and the read-out section 3 correspond to the read-out section in the present invention.

Figure 3:
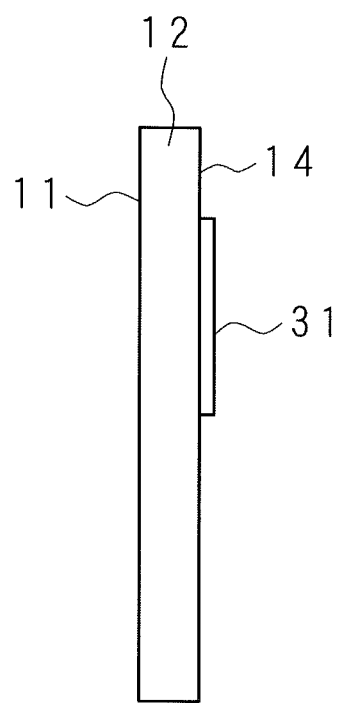
FIG. 3 is a schematic side view of a display panel.
Figure 5:
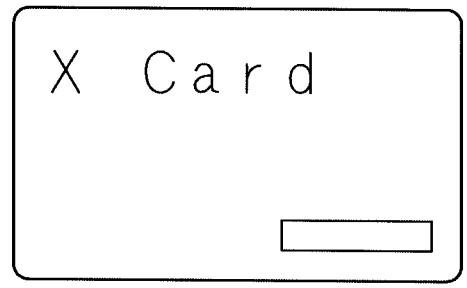
FIG. 5 is a schematic view illustrating an example of the outer appearance of a non-contact IC card.

FIG. 3 is a schematic side view of the display panel 12. In a case where the display panel 12 is an LCD panel, the display panel 12 includes a backlight. The antenna 31 is arranged at a rear surface 14 of the display panel 12, opposite from the display surface 11. FIG. 4 is a schematic rear view of the display panel 12. The antenna 31 is an electromagnetic induction coil antenna for wireless communications with a non-contact IC card. The shape of the antenna 31 is properly designed in advance based on the shape of a non-contact IC card to be used, the frequency (for example, 13.56 MHz) of a radio wave to be used in communications and the like. For example, the antenna 31 forms into the shape of a loop antenna. The antenna 31 is arranged at a predetermined position of the rear surface 14 of the display panel 12. For example, the antenna 31 is adhered to the rear surface 14 of the display panel 12 with a double-sided tape. Moreover, the antenna 31 is connected to the signal processing unit 32 with a signal line (not illustrated), FIG. 5 is a schematic view illustrating an example of the outer appearance of a non-contact IC card. The appearance of a non-contact IC card is made to be easily distinguishable between back and front sides, left and right sides, and top and bottom sides. The orientation of a non-contact IC card held by a user is possible to be easily distinguished by the card's appearance. A non-contact IC card has a built-in IC chip and antenna (not illustrated), and records data such as a unique card number. For example, the shape of the antenna 31 is made to conform to the shape of a non-contact IC card.

The copy machine 4 includes a copy control section 41 that controls the copy machine 4, a scanner section 42 and an image forming section 43 that forms an image and records it on a recording sheet. The scanner section 42 and the image forming section 43 are connected to the copy control section 41. The reader control section 21 is connected to the copy control section 41. The reader control section 21 inputs the data read out from a non-contact IC card to the copy control section 41. The copy control section 41 performs information processing for a payment using the input data and makes the scanner section 42 and the image forming section 43 execute copying.

Figure 6:
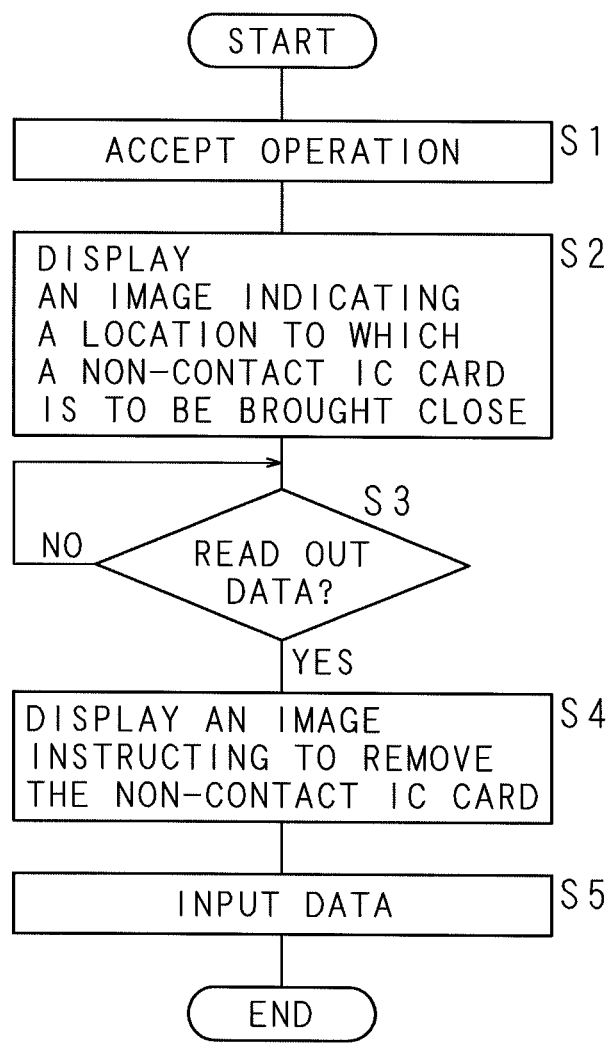
FIG. 6 is a flowchart illustrating the procedure of processing executed by a card reader according to Embodiment 1.

Next, the operation of the card reader 2 is described. FIG. 6 is a flowchart illustrating the procedure of processing executed by the card reader 2 according to Embodiment 1. When a user tries to make a photocopy using the copy machine 4 by paying a copying fee with a non-contact IC card carried by him/herself, the user operates the operation section 22 to input an instruction for payment. The card reader 2 accepts the input operation for a payment instruction at the operation section 22 (S1), and the reader control section 21 causes the image display section 1 to display an image that indicates a predetermined portion on the display surface 11 as a location to which a non-contact IC card is to be brought close (S2).

Figure 7:
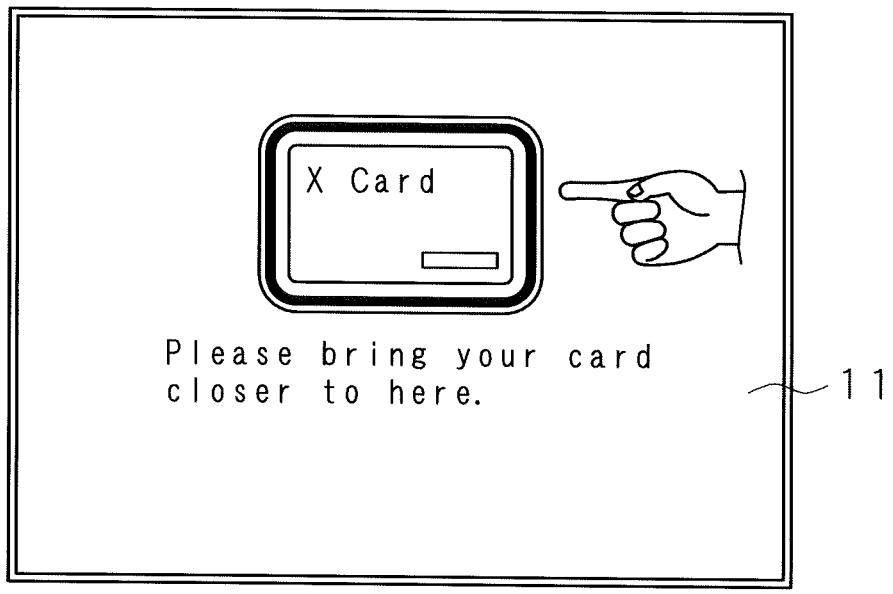
FIG. 7 is a schematic view illustrating an example of an image indicating a location to which a non-contact IC card is to be close.

FIG. 7 is a schematic view illustrating an example of an image that indicates a location to which a non-contact IC card is to be close. An image of a non-contact IC card is displayed at a predetermined portion on the display surface 11, while an image pointing the image of a non-contact IC card and an image of a text "Please bring your card closer to here" for urging the user to bring a non-contact IC card close to the display surface 11 are displayed. The portion where the image of a non-contact IC card is displayed on the display surface 11 is located at the front side of the portion where the antenna 31 is disposed on the rear surface 14 of the display panel 12, and the portion is determined in advance in accordance with the position of the antenna 31. In other words, the antenna 31 is arranged at a portion, which is located at the rear side of the portion where the image of a non-contact IC card is displayed at S2, on the rear surface 14 of the display panel 12. By displaying such an image, the card reader 2 urges the user to bring a non-contact IC card close to a predetermined portion on the display surface 11. The user who sights the image displayed on the image display section 1 brings his/her non-contact IC card close to the portion where the image of the non-contact IC card is displayed on the display surface 11. Then, the user makes the non-contact IC card either be in contact with the display surface 11 or be near the display surface 11 without contact. In a case where a non-contact IC card is close to the portion where the image of the non-contact IC card is displayed at S2, the distance between the non-contact IC card and the antenna 31 is made as short as possible, which makes it easier for the read-out section 3 to communicate with the non-contact IC card and to read out data.

Since the image of a non-contact IC card is displayed on the display surface 11 in order to indicate a location to which a non-contact IC card is brought close, it is easy for a user to find a location to which a non-contact IC card is brought close. A user who operates the card reader 2 can identify a location to which a non-contact IC card is brought close without turning his/her gaze away from the display surface 11. Thus, the user is possible to easily bring a non-contact IC card to a proper position.

Next, the reader control section 21 controls the read-out section 3 to communicate with a non-contact IC card, performs read-out processing for data recorded in the non-contact IC card by wireless, and determines whether data has actually been read out from the non-contact IC card or not (S3). In a state where a user has not brought a non-contact IC card close to a portion where the image of a non-contact IC card is displayed on the display surface 11, data cannot be read out from the non-contact IC card. In a case where data has not been read out from a non-contact IC card (S3: NO), the reader control section 21 repeats processing of reading out data from a non-contact IC card. In a case where data has actually been read out from a non-contact IC card (S3: YES), the reader control section 21 causes the image display section 1 to display an image that instructs a user to remove the non-contact IC card, which had been brought close to the display surface 11 (S4).

Figure 8:
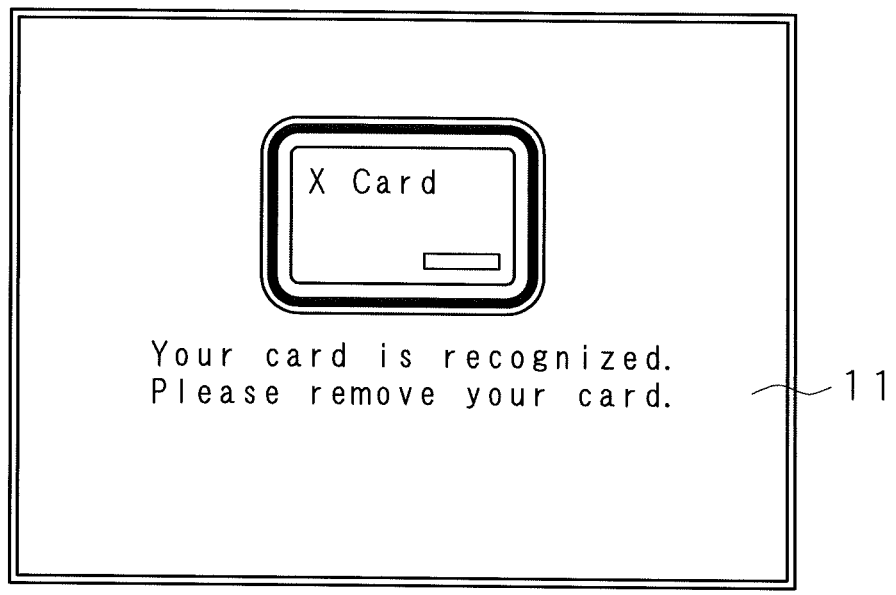
FIG. 8 is a schematic view illustrating an example of an image for instructing a user to remove a non-contact IC card.
Figure 9:
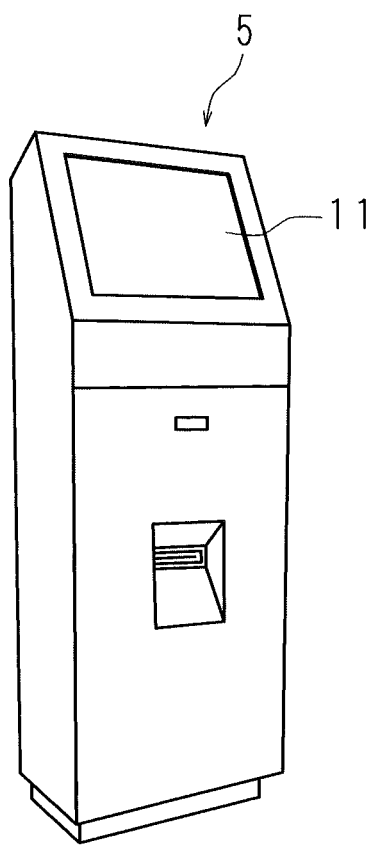
FIG. 9 is a schematic view illustrating an example of an information processing apparatus according to Embodiment 7.

FIG. 8 is a schematic view illustrating an example of an image for instructing a user to remove a non-contact IC card. An image of a text that instructs a user to remove a non-contact IC card from the display surface 11 is displayed. The user can identify a timing of removing a non-contact IC card and estimate the progress of processing. The reader control section 21 inputs data read out from a non-contact IC card to the copy control section 41 (S5), and terminates the data read-out processing. The copy control section 41 performs information processing for a payment using the input data and makes the scanner section 42 and the image forming section 43 execute copying.

In the present embodiment, as described above in detail, the card reader 2 shows an image that indicates a predetermined portion on the display surface 11 as a location to which a non-contact IC card is to be close, and reads out data from a non-contact IC card brought close by wireless. The user can identify a location to which a non-contact IC card is brought close without turning his/her gaze away from the display surface 11 and thus can bring a non-contact IC card close to a proper position for reading out data. Thus, the convenience of the card reader 2 is improved, while the possibility of the occurrence of an error operation in the card reader 2 is reduced. Since the card reader 2 is configured to read out data from a non-contact IC card which is close on the display surface 11, the card reader 2 does not have to particularly include a component for bringing a non-contact IC card close, apart from the image display section 1. Additionally, the card reader 2 does not have to particularly include a function that indicates a location to which a non-contact IC card is to be close, apart from the image display section 1. Thus, the number of necessary components for configuring the card reader 2 is reduced, achieving reduction in the cost and size of the card reader 2.

Embodiment 2

In Embodiment 2, a card reader 2 displays an image that indicates a timing at which a user is to bring a non-contact IC card close to a display surface 11. The card reader 2 normally does not display an image that indicates a location to which a non-contact IC card is to be close as shown in FIG. 7. The card reader 2 executes processing similar to that shown in FIG. 6, and causes the image display section 1 to display an image that indicates a location to which a non-contact IC card is to be close for the first time in the processing of S2. In this way, by displaying an image of a non-contact IC card for the first time at a timing when a user is to bring a non-contact IC card close to the display surface 11, the card reader 2 indicates a timing at which the user is to bring a non-contact IC card close to the display surface 11. The card reader 2 may also display an image of a text, which describes a timing at which a user is to bring a non-contact IC card close to the display surface 11, such as "Now, please bring your card closer", along with an image that indicates a location to which a non-contact IC card is to be brought close. A user can identify a timing of bringing a non-contact IC card close without turning his/her gaze away from the display surface 11, which makes it easier for the user to bring a non-contact IC card close to the display surface 11 at a proper timing for reading out data.

Embodiment 3

In Embodiment 3, a card reader 2 displays an image that shows an orientation of a non-contact IC card of when a user brings the card close to a display surface 11. The card reader 2 executes processing similar to that shown in FIG. 6, and causes an image display section 1 to display an image that shows the outer appearance of a non-contact IC card in detail, which is easily distinguishable between back and front sides, left and right sides and top and bottom sides, as an image that indicates a location to which the non-contact IC card is to be close at S2. A user tends to bring a non-contact IC card, which has the same orientation as that of the displayed image, close to the display surface 11. In this way, by displaying an image showing the outer appearance of a non-contact IC card, the card reader 2 can indicate an orientation of a non-contact IC card of when a user brings the card close to the display surface 11. The card reader 2 may also display an image that indicates an orientation of a non-contact IC card using a figure such as an arrow along with an image that indicates a location to which a non-contact IC card is to be brought close. The card reader 2 may also display an image with a text describing an orientation of a non-contact IC card such as "please bring your card closer with the card facing yourself and place it in the right direction" along with an image that indicates a location to which a non-contact IC card is to be brought close. A user can identify an orientation of when a non-contact IC card is brought close without turning his/her gaze away from the display surface 11, therefore, it is easy for the user to bring a non-contact IC card close to the display surface 11 at a proper orientation for reading out data. The card reader capable of reliably reading out data from a non-contact IC card by designating a proper orientation of a non-contact IC card for reading out data. Since the orientation of a non-contact IC card is designated, it is not needed to configure a read-out section 3 so as to enable reading out data from a non-contact IC card with an arbitrary orientation, allowing the read-out section 3 to have a simple configuration. It is thus possible to reduce the cost for the card reader 2.

Embodiment 4

In Embodiments 1 to 3, an antenna 31 is arranged at a rear surface 14 of a display panel 12. In the present embodiment, however, the antenna 31 is arranged at another location where communications with a non-contact IC card brought close to a display surface 11 is possible. For example, the antenna 31 may be arranged at the frame portion of an image display section 1.

Embodiment 5

In the present embodiment, a card reader 2 can read out data not only from one kind of non-contact IC cards, but also from multiple kinds of non-contact IC cards. A read-out section 3 is configured to be capable of reading data from multiple kinds of non-contact IC cards. In the present embodiment, the card reader 2 displays an image of different kinds of non-contact IC cards to be close to a display surface 1 on the image display section 1 at S2. The card reader 2 may display an image that indicates a location to which a non-contact IC card is to be close without displaying an image of a non-contact IC card.

Embodiment 6

In the present embodiment, the card reader 2 further includes a function of writing data for a non-contact IC card. A read-out section 3 has a function of writing data to a non-contact IC card by wireless. A signal processing unit 32 performs communications with a non-contact IC card using an antenna 31 to write data in a non-contact IC card. A reader control section 21 controls an operation of the signal processing unit 32. For example, a non-contact IC card may be a prepaid card, a copy control section 41 executes payment processing, and the card reader 2 executes processing of writing an account balance after payment into a non-contact IC card.

Embodiment 7

Figure 10:
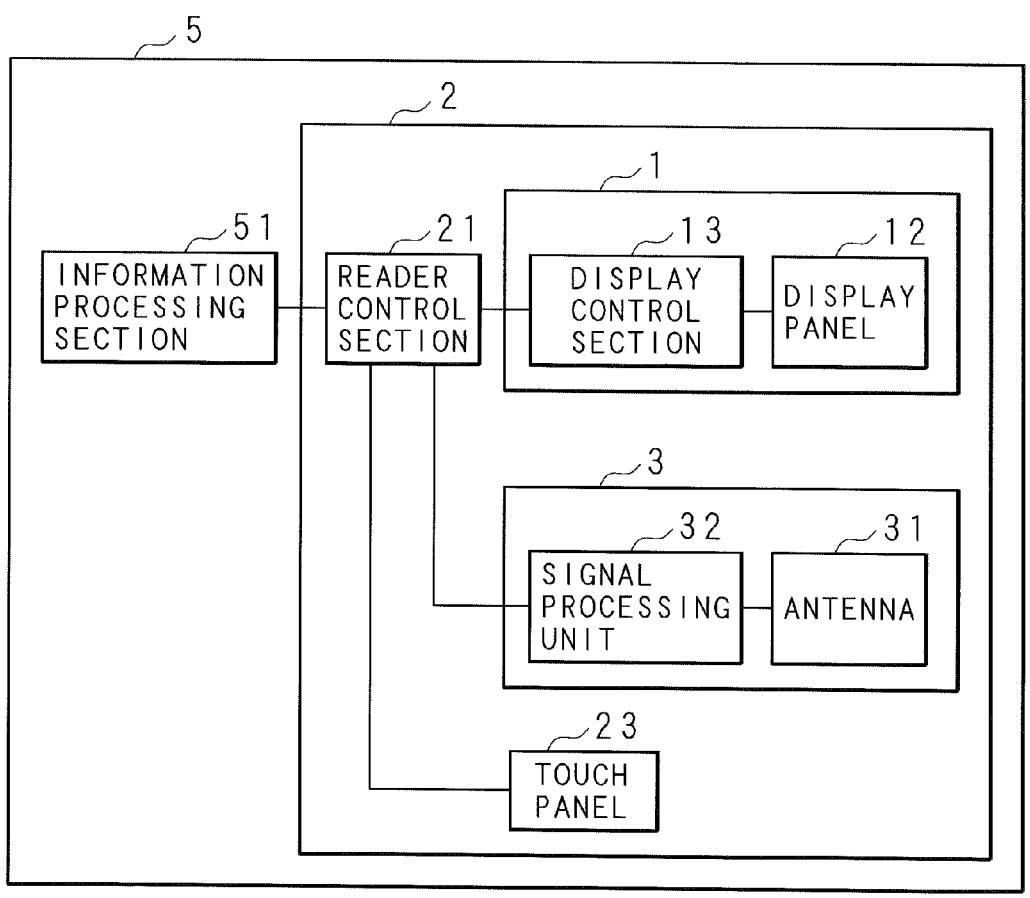
FIG. 10 is a block diagram illustrating an internal function configuration of the information processing apparatus according to Embodiment 7.

Embodiments 1 to 6 showed examples where the information processing apparatus of the present invention is configured to include the copy machine 4. Embodiment 7, however, shows an example where the information processing apparatus is a terminal device employed in a store (hereinafter also referred to as "store terminal device"). FTC 9 is a schematic view illustrating an example of an information processing apparatus 5 according to Embodiment 7. FIG. 10 is a block diagram illustrating an internal function configuration of the information processing apparatus 5 according to Embodiment 7. In the present embodiment, the information processing apparatus 5 is configured with a store terminal device including a card reader 2. The store terminal device is a terminal device installed in a store such as a convenience store or supermarket to provide various services in accordance with operations of customers. For example, the store terminal device may be a multimedia station or a photograph printing terminal. The store terminal device executes information processing for services such as reward points giving, issuance of coupons, payment of fees, or photograph printing. The user of the store terminal device is a customer of the store.

The card reader 2 includes a reader control section 21, a read-out section 3, and a touch panel 23 accepting the operation of the user. The image display section 1, read-out section 3 and touch panel 23 are connected to the reader control section 21. The image display section 1 includes a display panel 12 and a display control section 13. One surface of the display panel 12 is formed as a display surface 11, while the touch panel 23 is formed on top of the display surface 11. The read-out section 3 includes an antenna 31 and a signal processing unit 32. The antenna is disposed in a manner similar to that in Embodiments 1 to 6. Moreover, the information processing apparatus 5 includes an information processing section 51 which executes information processing required for a store terminal device. The information processing section 51 is connected to the reader control section 21. The reader control section 21 inputs the data read from the non-contact IC card to the information processing section 51, which executes information processing using the input data.

Figure 11:
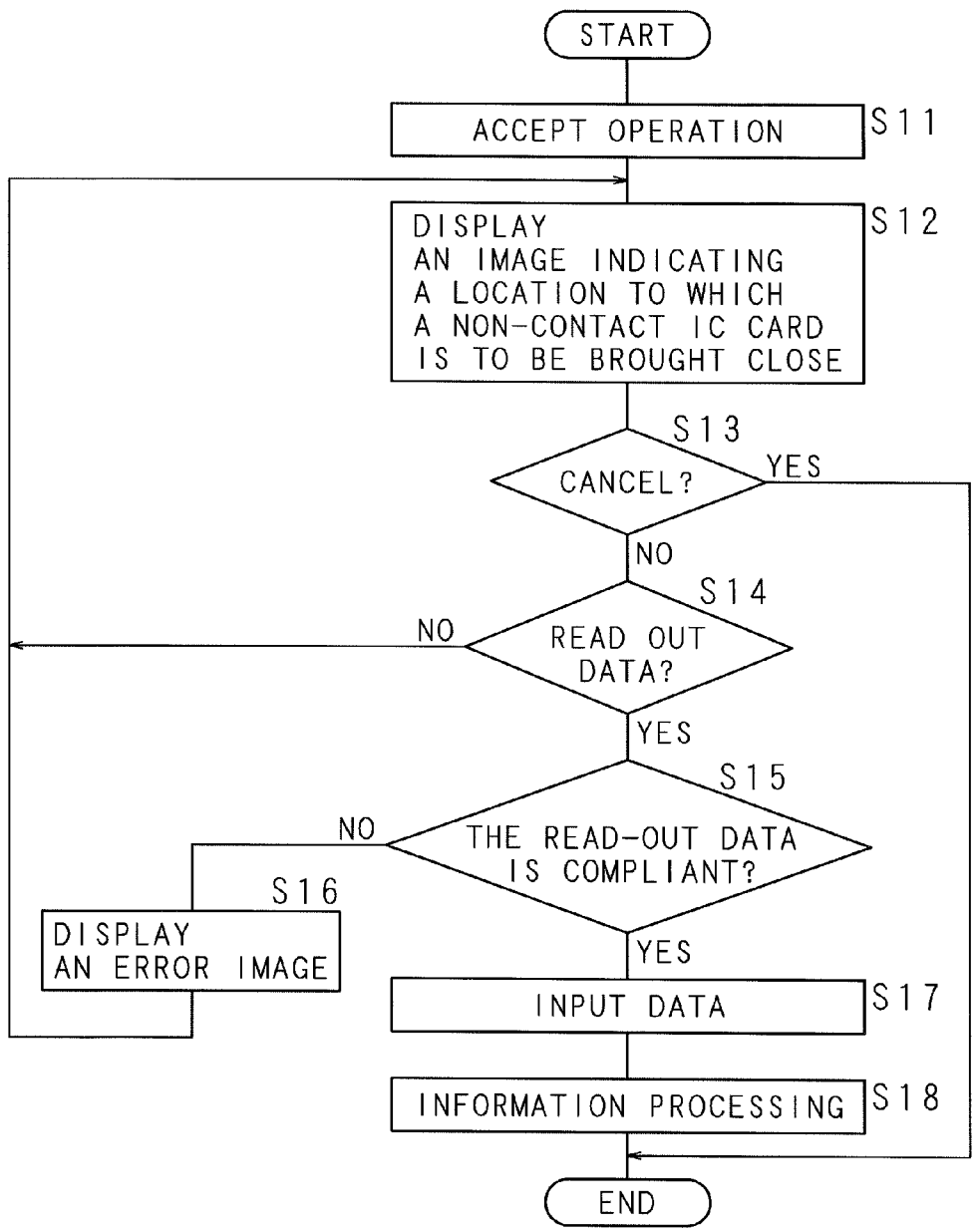
FIG. 11 is a flowchart illustrating a procedure of processing executed by the information processing apparatus according to Embodiment 7.
Figure 12:
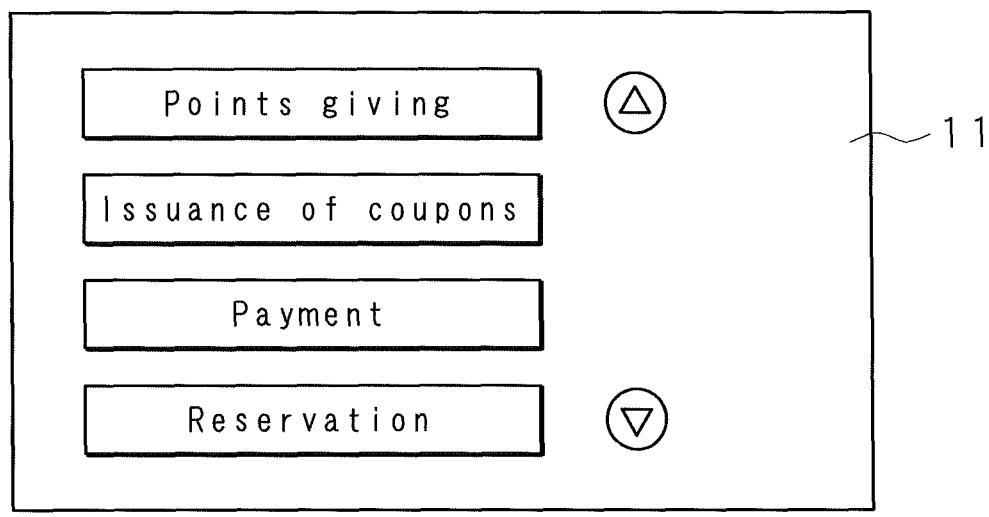
FIG. 12 is a schematic view illustrating an example of a menu screen according to Embodiment 7.
Figure 13:
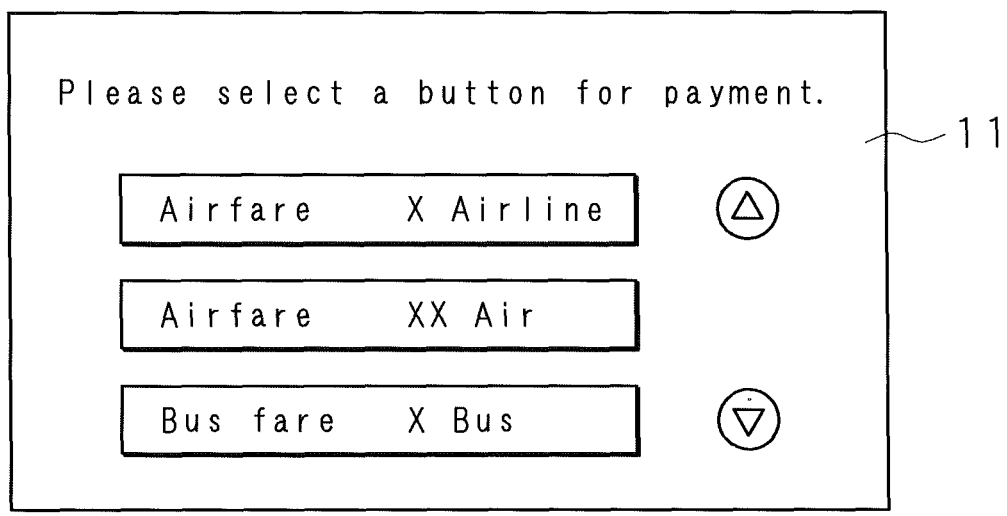
FIG. 13 is a schematic view illustrating an example of a menu screen according to Embodiment 7.

Next, the processing performed by the information processing apparatus 5 according to the present embodiment is described. As an example, processing performed when the user makes a payment using a non-contact IC card is described. FIG. 11 is a flowchart illustrating a procedure of processing executed by the information processing apparatus 5 according to Embodiment 7. The user operates a touch panel 23 to input an instruction for payment of a fee. Here, the image display section 1 displays a menu screen, which is used by the user to input instructions. FIGS. 12 and 13 show schematic views illustrating examples of a menu screen according to Embodiment 7. As illustrated in FIG. 12, multiple buttons including a button on which "Payment" is written are displayed on the display surface 11, and the user operates the touch panel 23 so as to designate the button of "Payment." In accordance with the designation of a button, as illustrated in FIG. 13, the list of payment recipients is displayed on the display surface 11, and the user operates the touch panel 23 so as to designate a button on which a specific recipient is written. The card reader 2 accepts at the touch panel 23 the operation of inputting the instruction for payment (S11).

Figure 14:
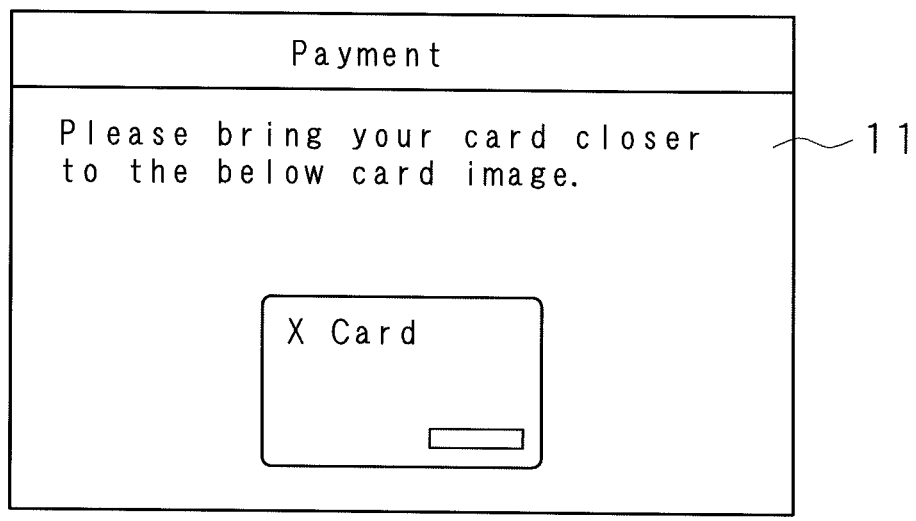
FIG. 14 is a schematic view illustrating an example of an image indicating a location to which a non-contact IC card is to be close according to Embodiment 7.

The reader control section 21 causes the image display section 1 to display an image indicating a predetermined portion to which a non-contact IC card is close on the display surface 11 (S12). FIG. 14 is a schematic view illustrating an example of an image indicating a location to which a non-contact IC card is to be close according to Embodiment 7. As in Embodiments 1 to 6, the image of a non-contact IC card is displayed at a position where wireless communication between the non-contact IC card and antenna 31 is made possible when the non-contact IC card is placed over that position. In the non-contact IC card, for example, an identification number for identifying a user is recorded. The card reader 2 waits to accept an instruction for canceling (S13). If the operation of inputting an instruction for canceling is accepted at the touch panel 23 (S13: YES), the reader control section 21 terminates the processing. If the instruction for cancelling is not accepted (S13: NO), the reader control section 21 controls the read-out section 3 to communicate with the non-contact IC card, performs processing of reading out data recorded in the non-contact IC card, and determines whether or not the data has actually been read out (S14). There may be cases where data cannot be read out from a 0.15 non-contact IC card, such as where a non-contact IC card is not recognized, or a non-contact IC card is invalid. If data has not been read out from the non-contact IC card (S14: NO), the reader control section 21 returns the processing to 812. If data has been read out from the non-contact IC card (S14: YES), the reader control section. 21 determines whether or not the read-out data is compliant with the card reader 2 (S15). If the data is not compliant with the card reader 2 (S15: NO), the reader control section 21 causes the image display section 1 to display an error image indicating that the data is non-compliant (S16), and returns the processing to S12. For example, data is regarded as non-compliant when a non-contact IC card which is not compliant with the card reader 2 is recognized. It is noted that the reader control section 21 may terminate the processing at the time when S16 is executed.

If the data read out from the non-contact IC card is compliant with the card reader 2 (S15: YES), the reader control section 21 inputs the data read out from the non-contact IC card to the information processing section 51 (S17). For example, when the identification number of the user is recorded in the non-contact IC card, the identification number is read out from the non-contact IC card and is input to the information processing section 51. The information processing section 51 uses the input data to execute information processing for payment of fees (S18). For example, the information processing section 51 authenticates a user by the identification number of the user, specifies online the amount of a fee which is determined in advance to be paid by the user, and performs processing of online payment of the fee. For another example, the information processing apparatus 5 includes a printing function, and the information processing section 51 performs processing of issuing a bill to the user. After the information processing is terminated, the information processing section 51 inputs the information indicating that the information processing is terminated to the reader control section 21, which causes the image display section 1 to display an image indicating that the processing for fee payment is terminated, or an image instructing to remove a non-contact IC card. The information processing apparatus 5 terminates the processing here. It is also possible for the information processing apparatus 5 to, in a similar manner, read out data from the non-contact IC card and execute processing other than payment of fees, as a store terminal device.

Embodiment 8

Figure 15:
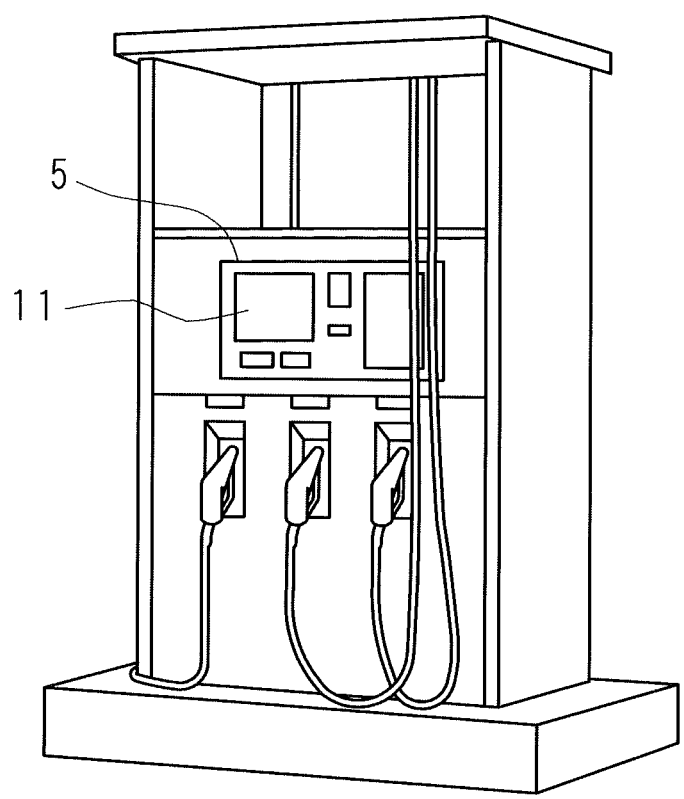
FIG. 15 is a schematic view illustrating an example of an information processing apparatus according to Embodiment 8.

Embodiment 8 shows an example where the information processing apparatus is a POS (Point of Sale) system terminal. FIG. 15 is a schematic view illustrating an example of an information processing apparatus 5 according to Embodiment 8. In the present embodiment, the information processing apparatus 5 is configured with a POS system terminal including a card reader 2. FIG. 15 illustrates an example of a POS system terminal installed in a gas station. It is noted that the information processing apparatus 5 may also be a POS system terminal having a function of a cash register installed in a store such as a convenience store or a super market. The POS system terminal is used to record reward points into a non-contact IC card or to use reward points recorded in a non-contact IC card. The user of the POS system terminal may be a customer or a store staff. The internal function configuration of the information processing apparatus 5 is similar to that in Embodiment 7 illustrated in FIG. 10. The information processing section 51 executes information processing required for the POS system terminal.

The processing of the information processing apparatus 5 according to the present embodiment is described. As an example of the processing, processing performed when the user puts gas in a car using the reward points recorded in a non-contact IC card. The procedure of processing executed by the information processing apparatus 5 is similar to that in Embodiment 7 illustrated in FIG. 11, The image display section 1 displays a menu screen, while the user inputs instructions for feeding gas and using reward points on a menu screen. FIG. 16 is a schematic view illustrating an example of a menu screen according to Embodiment 8. As illustrated in FIG. 16, multiple buttons for selecting the type of fuel and a button on which "use points" is written are displayed on the display surface 11, and the user operates the touch panel 23 so as to designate a button for selecting any one type of the fuel as well as the button to "use points." At S11, the card reader 2 accepts an operation at the touch panel 23.

Figure 17:
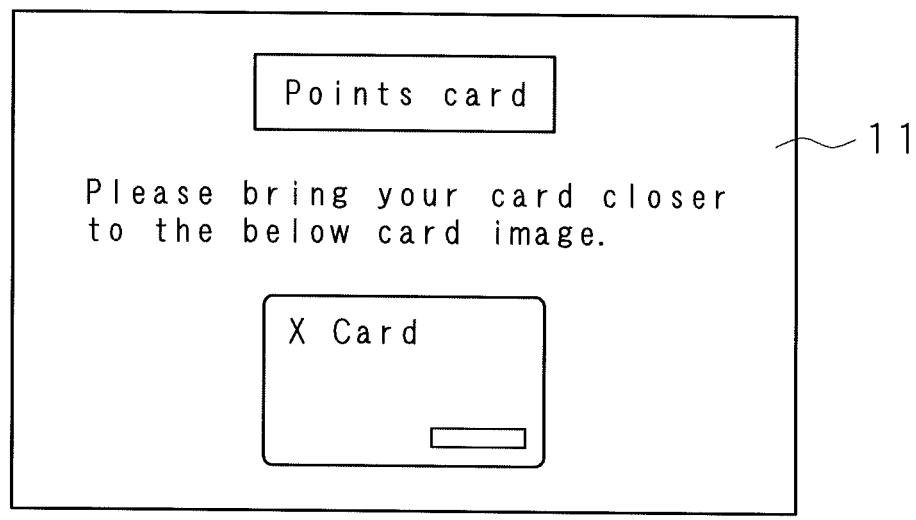
FIG. 17 is a schematic view illustrating an image indicating a location to which a non-contact IC card is to be close according to Embodiment 8.

At S12, the reader control section 21 causes the image display section 1 to display an image indicating a predetermined portion on the display surface 11 to which a non-contact IC card is to be brought close. FIG. 17 is a schematic view illustrating an image indicating a location to which a non-contact IC card is to be close according to Embodiment 8. As in Embodiments 1 to 7, an image of the non-contact IC card is displayed at a predetermined position on the display surface 11. Reward points are recorded in the non-contact IC card. At S14, the reader control section 21 reads out data recorded in the non-contact IC card. The reward points are read out from the non-contact IC card and input to the information processing section 51. At S18, the information processing section 51 uses the input data to execute information processing for feeding gas and using reward points. For example, the information processing section 51 inputs data indicating the value of reward points left, obtained by subtracting the value corresponding to the amount of gas, to the reader control section 21, and the reader control section 21 causes the read-out section 3 to record the updated reward points in the non-contact IC card. For another example, the information processing section 51 performs processing of subtracting an amount according to the reward points from the fee for gas and making a payment for the subtracted amount of the fee. Likewise, the information processing apparatus 5 may execute the processing of recording reward points according to the amount of fed gas in the non-contact IC card. Furthermore, the information processing apparatus 5 may also take a form of making a payment for a gas fee using a non-contact IC card which is a debit card, credit card, prepaid card or post-pay card.

Embodiment 9

Embodiment 9 shows an example where the information processing apparatus is an ATM (Automated Teller Machine). FIG. 18 is a schematic view illustrating an example of an information processing apparatus 5 according to Embodiment 9. In the present embodiment, the information processing apparatus 5 is configured by an ATM including a card reader 2. The ATM performs bank transactions using a cash card formed of a non-contact IC card. The internal function configuration of the information processing apparatus 5 is similar to that in Embodiment 7 illustrated in FIG. 10. The information processing section 51 executes information processing required for the ATM.

Figure 19:
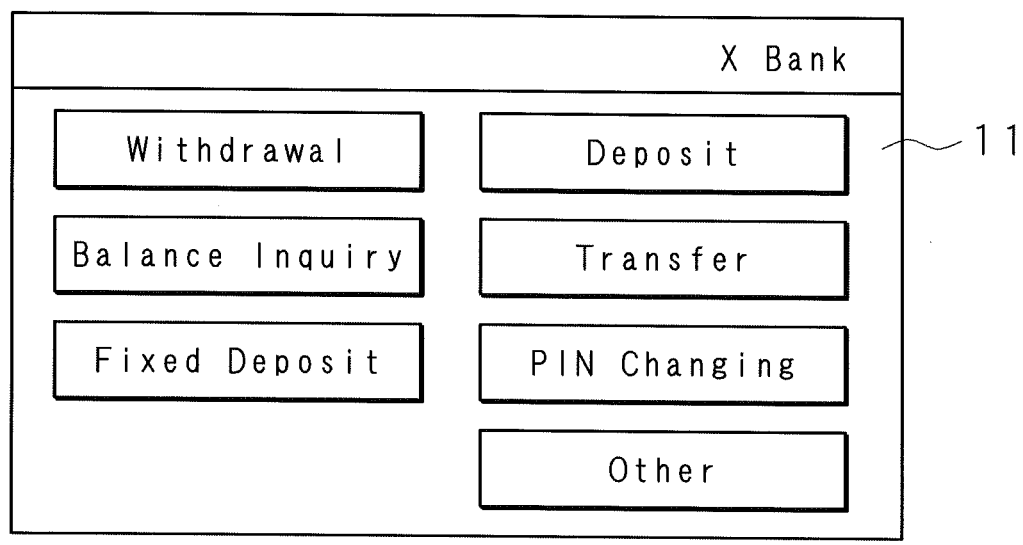
FIG. 19 is a schematic view illustrating an example of a menu screen according to Embodiment 9.

The processing performed by the information processing apparatus 5 according to the present embodiment is described. The procedure of processing executed by the information processing apparatus 5 is similar to that in Embodiment 7 illustrated in FIG. 11. The image display section 1 displays a menu screen, which is used by the user to input instructions for transactions. FIG. 19 is a schematic view illustrating an example of a menu screen according to Embodiment 9. As illustrated in FIG. 19, multiple buttons for selecting transactions such as withdrawal, deposit and balance inquiry are displayed on the display surface 11. The user operates a button for selecting any one of the transactions. For example, the user operates the touch panel 23 so as to designate the button for "Balance Inquiry." At S11, the card reader 2 accepts the operation at the touch panel 23.

Figure 20:
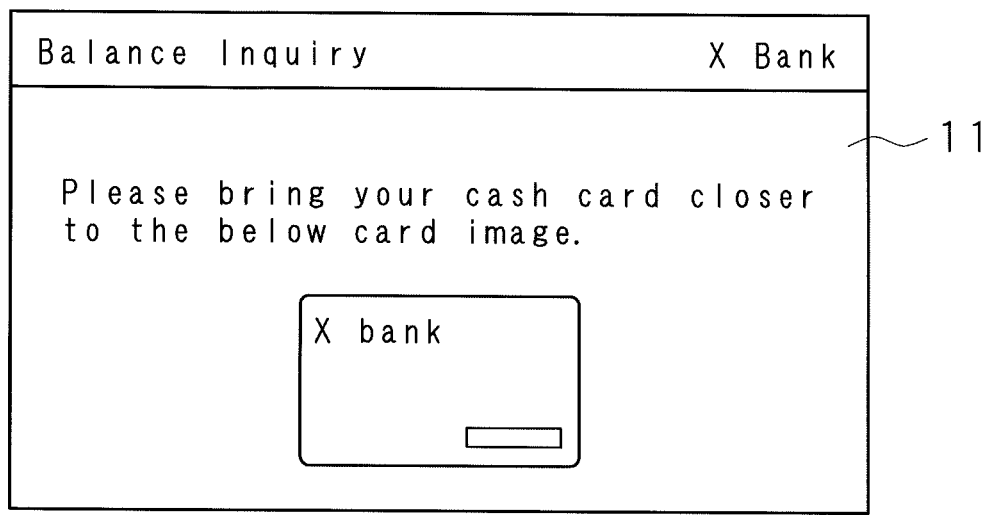
FIG. 20 is a schematic view illustrating an example of an image indicating a location to which a non-contact IC card is close according to Embodiment 9.

At S12, the reader control section 21 causes the image display section 1 to display an image indicating a predetermined portion on the display surface 11 to which the non-contact IC card is to be brought close. FIG. 20 is a schematic view illustrating an example of an image indicating a location to which a non-contact IC card is close according to Embodiment 9. As in Embodiments 1 to 8, an image of a cash card formed of a non-contact IC card is displayed at a predetermined position on the display surface 11. In the non-contact IC card, for example, an account number is recorded. At S14, the reader control section 21 reads out the data recorded in the non-contact IC card. At S18, the information processing section 51 uses the read-out data to execute information processing for bank transactions. For example, the information processing section 51 specifies an account balance based on the account number, inputs the data indicating the balance to the reader control section 21, which causes the image display section 1 to display an image indicating the balance by a numeric value. Here, the information processing apparatus 5 may also cause the image display section 1 to display an image for showing that the non-contact IC card is recognized and for urging the user to further input a PIN (Personal Identification Number), accepts the input of the PIN, and performs information processing using the PIN and data read out from the non-contact IC card. It is noted that the information processing apparatus 5 may execute the processing of bank transactions other than balance inquiry, such as withdrawal or deposit, in a similar manner.

It is also possible for the information processing apparatus 5 to perform processing of handling money using a non-contact IC card in a method other than the ones described in Embodiments 1 to 9 above. For example, the information processing apparatus 5 may be a device for charging electronic money to a non-contact IC card.

Embodiment 10

Embodiments 1 to 9 showed examples of performing money handling processing using data read out from a non-contact IC card. However, an information processing apparatus according to the present embodiment executes another processing using data read out from a non-contact IC card, such as a personal authentication. For example, an information processing apparatus may be a device that issues a certificate such as a residency registration document after a personal authentication using a non-contact IC card such as a basic resident register card. The information processing apparatus may also be a general purpose computer, such as a PC (personal computer), to which the card reader 2 is connected. The card reader 2 is not only restricted to an apparatus for exclusive use, but may be incorporated into a machine having functions other than the card reader 2 functions such as a notebook PC or tablet PC.

Embodiment 11

Embodiments 1 to 10 showed examples where a recording medium is a non-contact IC card and a data read-out device according to the present invention is a card reader 2. In the present embodiment, however, a data read-out device reads out data without contact from a recording medium other than a non-contact IC card. For example, a recording medium is a mobile phone, and a data read-out device reads out data by wireless from a mobile phone.

The configuration elements in various examples described in Embodiments 1 to 11 may also be combined with each other.

As described above, a data read-out device (2) according to the present invention that reads out data recorded in a recording medium without contact via radio waves is characterized by comprising an image display section (1) having a display surface (11) for an image, control means (21) for displaying an image that indicates a predetermined portion on the display surface (11) to which a recording medium is close, and read-out means (3) for reading out data recorded in a recording medium brought close to the predetermined portion without contact via radio waves.

The data read-out device (2) according to the present invention is characterized in that the control means (21) is configured to cause the image display section (1) to display an image that indicates a timing of bringing a recording medium close to a predetermined portion.

The data read-out device (2) according to the present invention is characterized in that the control means (21) is configured to cause the image display section (1) to display an image that indicates an orientation of the recording medium when it is close to a predetermined portion.

The data read-out device (2) according to the present invention is characterized in that the image display section (1) includes a display panel (12) having one surface configured as the display surface (11), and the read-out means (3) includes an antenna (31) for reading out data from a recording medium without contact via radio waves, and that the antenna (31) is arranged at a portion, which is located at the rear side of the predetermined portion, on another surface (14) of the display panel (12).

An information processing apparatus according to the present invention is characterized by comprising: the data read-out device (2) according to the present invention; and means for executing information processing using data read out by the data read-out device (2) from a recording medium.

In the present invention, a data read-out device (2) includes an image display section (1), which displays an image that indicates a predetermined portion on a display surface (11) as a location to which a recording medium is to be close, and reads out data by wireless from a recording medium brought close. An information processing apparatus with the data read-out device (2) executes processing using data read out from a recording medium, such as payment or personal authentication. A user can identify a location to which a recording medium is to be brought close without turning his/her gaze away from the display surface (11) so that the information processing apparatus can easily execute necessary processing.

In the present invention, the data read-out device (2) displays an image that indicates a timing at which a user is to bring a recording medium close. A user can identify a timing of bringing a recording medium close without turning his/her gaze away from the display surface (11).

In the present invention, the data read-out device (2) displays an image that indicates an orientation of a recording medium, which is to be brought close to the display surface (11) by a user. It is possible for the user to identify the orientation of the recording medium of when bringing it close to the display surface (11) without turning his/her gaze away from the display surface (11). By specifying a proper orientation of a recording medium for reading out data, the data read-out device (2) can reliably read out data from a non-contact IC card.

In the present invention, the data read-out device (2) has an antenna (31) for communicating with a recording medium by wireless, and the antenna (31) is arranged at a portion, which is located at the rear side of a predetermined portion of the display surface (11) to which a recording medium is to be close, on a rear surface (14) of a display panel (12). In a case where a recording medium is close to the display surface (11), the distance between the recording medium and the antenna (31) can be made as short as possible so that it is easier to read out data from the recording medium.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data read-out device, comprising:
    a read-out section that reads out data recorded in a recording medium by wireless communication;
    an image display including an image display surface; and
    a controller that causes the image display to display an image indicating a predetermined portion to which the recording medium is to be close; wherein
    the predetermined portion is on the image display surface;
    the read-out section reads out data recorded in the recording medium close to the predetermined portion;
    the recording medium is a card;
    the read-out section is configured to read out data from a plurality kinds of cards; and
    the controller causes the image display to display a card image of a kind of card included in the plurality kinds of cards based on a kind of the card which is to be close to the predetermined portion as the image indicating the predetermined portion.

2. The data read-out device according to claim 1, wherein the controller causes the image display to display an image indicating a timing at which the recording medium is to be close to the predetermined portion.

3. The data read-out device according to claim 1, wherein the controller causes the image display to display the image indicating the predetermined portion at a timing in which the recording medium is to be close to the predetermined portion.

4. The data read-out device according to claim 1, wherein the controller causes the image display to display an image indicating an orientation of the recording medium of when the recording medium is close to the predetermined portion.

5. The data read-out device according to claim 1, wherein the controller causes the image display to display the card image at a timing in which the recording medium is to be close to the predetermined portion.

6. The data read-out device according to claim 1, wherein the controller causes the image display to display an image that indicates an outer appearance of the card with an orientation of when the card is close to the predetermined portion, as the card image.

7. The data read-out device according to claim 1, wherein
    the image display includes a display panel having one surface configured as the image display surface;
    the read-out section includes an antenna that reads out data from the recording medium by wireless communication; and
    the antenna is arranged at a portion located at the rear side of the predetermined portion on another surface of the display panel.

8. An information processing apparatus, comprising:
    a data read-out device; and
    an information processing section that executes information processing using data read out from a recording medium by the data read-out device; wherein
    the data read-out device includes:
        a read-out section that reads out data recorded in a recording medium by wireless communication;
        an image display including an image display surface; and
        a controller that causes the image display to display an image indicating a predetermined portion to which the recording medium is to be close, the predetermined portion is on the image display surface;
    the read-out section reads out data recorded in the recording medium close to the predetermined portion;
    the recording medium is a card;
    the read-out section is configured to read out data from a plurality kinds of cards; and
    the controller causes the image display to display a card image of a kind of card included in the plurality kinds of cards based on a kind of the card which is to be close to the predetermined portion as the image indicating the predetermined portion.

* * * * *